United States Patent
Lotspeich et al.

(10) Patent No.: US 11,113,392 B2
(45) Date of Patent: Sep. 7, 2021

(54) EXECUTABLE BINARY CODE INSERTION

(71) Applicant: RunSafe Security, Inc., McLean, VA (US)

(72) Inventors: Erik Raymond Lotspeich, Huntsville, AL (US); David Nicholas Graham, Huntsville, AL (US)

(73) Assignee: RUNSAFE SECURITY, INC., McLean, VA (US)

( * ) Notice: Subject to any disclaimer, the term of this patent is extended or adjusted under 35 U.S.C. 154(b) by 212 days.

(21) Appl. No.: 16/539,612

(22) Filed: Aug. 13, 2019

(65) Prior Publication Data

US 2020/0057849 A1 Feb. 20, 2020

Related U.S. Application Data

(60) Provisional application No. 62/718,856, filed on Aug. 14, 2018.

(51) Int. Cl.
*G06F 21/50* (2013.01)
*G06F 21/51* (2013.01)
*G06F 21/52* (2013.01)
*G06F 21/54* (2013.01)
*G06F 21/56* (2013.01)
*G06F 21/57* (2013.01)

(52) U.S. Cl.
CPC .......... *G06F 21/54* (2013.01); *G06F 21/563* (2013.01); *G06F 21/566* (2013.01); *G06F 21/577* (2013.01); *G06F 21/50* (2013.01); *G06F 21/51* (2013.01); *G06F 21/52* (2013.01)

(58) Field of Classification Search
CPC .......... G06F 21/50; G06F 21/51; G06F 21/52; G06F 21/54; G06F 21/56; G06F 21/57; G06F 21/563; G06F 21/566; G06F 21/577
See application file for complete search history.

(56) References Cited

U.S. PATENT DOCUMENTS

| | | | |
|---|---|---|---|
| 8,667,597 B2* | 3/2014 | Safford, III | G06F 9/32 726/26 |
| 9,361,102 B2* | 6/2016 | Tan | G06F 9/30058 |
| 2004/0177263 A1* | 9/2004 | Sobel | G06F 21/51 726/22 |
| 2013/0014275 A1* | 1/2013 | Goodes | G06F 21/14 726/26 |
| 2015/0135313 A1* | 5/2015 | Wesie | G06F 9/445 726/22 |
| 2019/0303574 A1* | 10/2019 | Lamay | G06F 21/564 |

* cited by examiner

*Primary Examiner* — Jayesh M Jhaveri
(74) *Attorney, Agent, or Firm* — Womble Bond Dickinson (US) LLP

(57) ABSTRACT

An automated and processor agnostic method is described for modifying one or more executable binary files to insert one or more new software segments to modify the execution of the one or more executable binary files in at least certain circumstances. The modification takes into account the target microprocessor architecture of the one or more executable binary files which can be in the ELF format. In one embodiment, the new software segments are configured to add at least monitoring capabilities to monitor control flow integrity during execution of the one or more executable binary files.

20 Claims, 3 Drawing Sheets

EXECUTABLE BINARY CODE INSERTION

This application claims the benefit of priority to U.S. Provisional Patent Application No. 62/718,856, filed Aug. 14, 2018, which application is hereby incorporated herein by reference.

BACKGROUND

The present disclosure relates to methods and systems for modifying one or more executable binary files to insert one or more new software segments to modify the execution of the one or more executable binary files in at least certain circumstances. The present disclosure also relates to techniques for protecting computer programs or software from exploits and malware. For example, this disclosure relates to techniques that prevent an exploit from gaining control over a program through a return oriented programming attack or other techniques used by malware developers.

A malware creator will typically attack a computer program in at least one of two ways. The malware creator can attempt to inspect and/or modify the data used by the computer program in order to force the program to do or to achieve the result desired by the malware creator. Also, the malware creator can attempt to attack the program by attacking the control flow of the computer program. Programs use conventional control flow techniques, such as IF statements, conditional jumps, etc., in order to cause the program to execute or operate in a certain flow. The control flow of the computer program is typically specified by branches, and at each branch the flow can go in at least one of two directions depending upon the instructions in the computer program at a particular branch and also depending upon one or more values used by the computer program at the particular branch. Malware creators will attempt to hijack a branching control flow instruction in order to cause the program to achieve a result desired by the malware creator.

Software developers can respond to these attacks by using auditing techniques that are injected into the software during the development of the software when the software is in source code form. For example, branch auditing software, in source code form, can be injected to audit the execution of the computer program at its branches in order to monitor and take action should malware attempt to hijack the computer program. U.S. Pat. No. 9,047,448 describes an example of the use of such branch auditing software.

SUMMARY OF THE DESCRIPTION

The methods described herein operate on executable binary files that have been compiled, and in most circumstances the executable binary file has been compiled for execution on a target processing system that has a particular microprocessor architecture. In one embodiment, one or more executable binary files can be modified to incorporate one or more new executable sections that have been designed to modify the execution behavior of the modified binary file in such a way as to protect the software from malware attacks. The modifications are configured to allow normal operation of the software (when malware has not infected the software) but are designed to prevent an unintended use of the software by malware which hijacks the software by modifying for example the control flow of the software. In one embodiment, the one or more new software segments are configured to add at least monitoring capabilities to monitor control flow integrity during execution of the executable binary file. In one embodiment, the modifications are performed using the existing executable software file itself rather than source code of the file. Thus the embodiments described herein can be used when source code is not available for the existing executable software file itself.

In one embodiment, a method for modifying an executable software file can include the following operations: receiving an existing executable software file; receiving a new loadable section for an executable segment of software to be added to the existing executable software file; copying content of a section header string table in the existing executable software file into a new section header string table for which memory has been allocated; adding a new section name for the new loadable section into the new section header string table; writing the new loadable section to an end of the existing executable software file; copying content of a section header table in the existing executable software file into a new section header table and adding a new section entry data for the new loadable section into the new section header table and writing the new section header table into the existing executable software file; copying content of a program header table in the existing executable software file into a new program header table and adding a new segment entry data for the executable segment into the new program header table and writing the new program header table into the existing software file; and returning a virtual address and a file offset for the executable segment added to the existing executable software file to create a new executable software file.

In one embodiment, the executable segment can be software designed to monitor control flow integrity during execution of the new executable software file. In addition, the executable segment can be configured to take corrective action or other action to prevent loss of control by the computer program which is embodied by the new executable software file. In one embodiment, the execution of the new executable software file can be tested by comparing execution of the new executable software file to execution of the existing executable software file as it existed before modifications by the method. This testing by the comparison of the two software files can determine, in one embodiment, whether the normal behavior of the existing executable software file is still provided by the new executable software file which has the additional advantage of including control flow integrity functionality and/or other functionality. In one embodiment, the method can be performed automatically by software insertion logic operating on a data processing system that stores the existing executable software file and which also creates and stores the new loadable section for the executable segment. In one embodiment, the existing executable software can be compiled for execution on a predefined microprocessor architecture, and the methods described herein can be capable of being performed for a plurality of different microprocessor architectures such that the method can be considered to be agnostic relative to the different microprocessor architectures. In one embodiment, the creation of the new loadable section can be based upon specified characteristics of the existing executable software file, and these specified characteristics can include a target microprocessor architecture.

The embodiments and systems described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory such as volatile DRAM.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
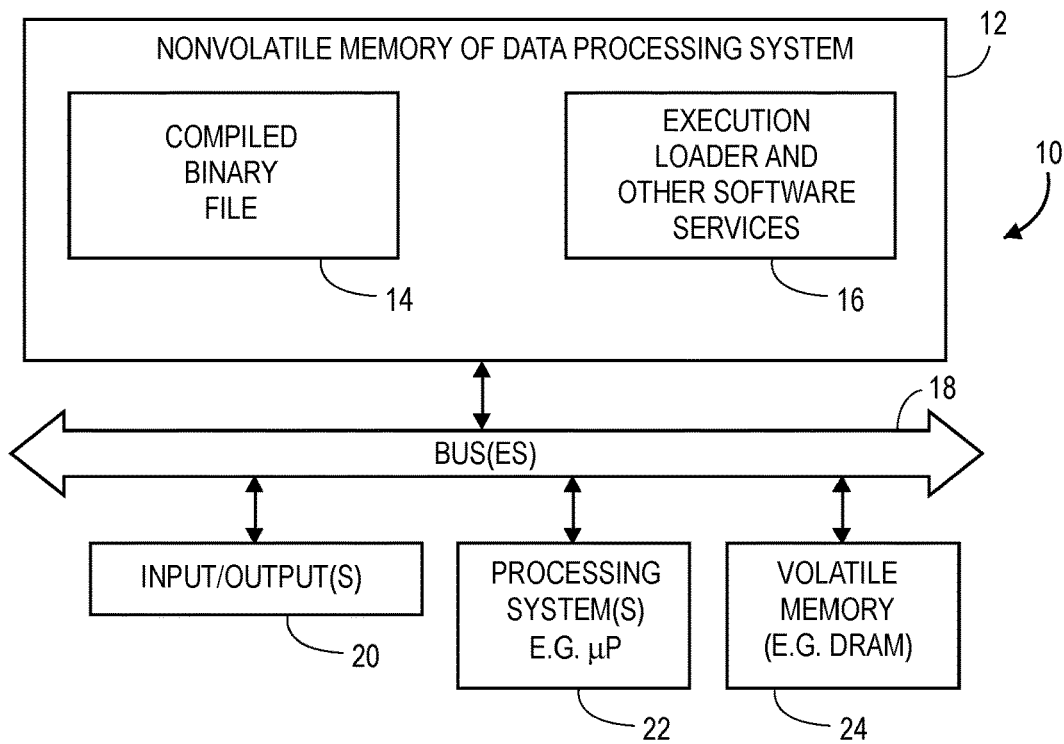
FIG. 1 shows an example of a data processing system which can be used to perform one or more methods described herein.

The methods described herein can be performed on one or more data processing systems that can store compiled binary files that can be modified using the methods described herein. FIG. 1 shows an example of a data processing system 10 which includes a nonvolatile memory 12 which is coupled to one or more buses 18. The one or more buses 18 are also coupled to a processing system 22 and a volatile memory 24. The processing system 22 can be one or more microprocessors as is known in the art. In addition, the one or more buses 18 can be coupled to one or more input/output devices through one or more controller interfaces that act as an interface between the input and/or output devices and the remainder of the data processing system 10. The nonvolatile memory 12 can be for example flash memory or a hard disk drive or other known nonvolatile memory devices. The nonvolatile memory 12 can store execution loader software 16 and other software services which can include operating system software and other software used to allow a binary file to execute. The compiled binary file 14 can be used in the methods described herein to modify the compiled binary file 14 by adding new software which can change the behavior of the compiled binary file when executed in at least certain circumstances. In one embodiment, the new software which is added does not impact or alter legitimate system behavior by the compiled binary file when executed but does provide security enhancements such as control flow integrity enhancements that can at least monitor control flow of the program. Moreover, additional security enhancements can also be included that do not impact legitimate program execution when the compiled binary file 14 is executed. In one embodiment, the system 10 can be a data processing system that creates the modifications which are added to the compiled binary file 14 and then provides for the execution of the compiled binary file 14 after the modifications at runtime of the compiled binary file 14 after the modifications. The volatile memory 24 can be DRAM memory and is typically used at runtime by the processing system 22 to store program instructions and data, such as the program instructions and data that can be used to create the modifications for the compiled binary file and to then insert those modifications into the original compiled binary file to create a modified compiled binary file which can then be executed on the system 10 or another data processing system.

Figure 2:
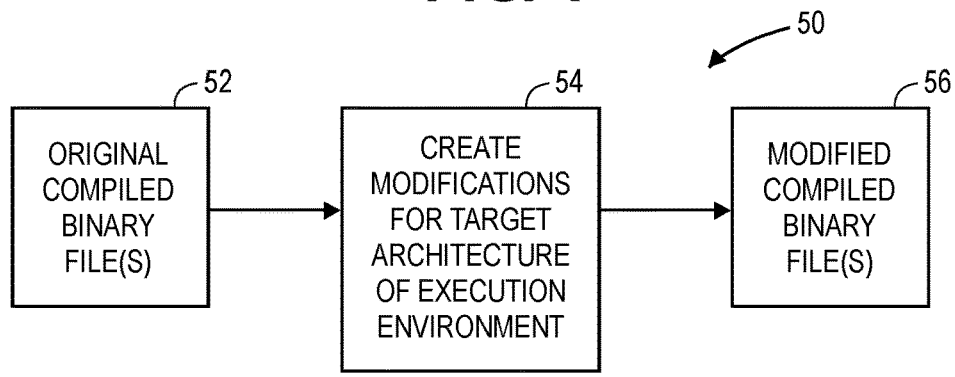
FIG. 2 shows an example of a method which can be used to create modified binary files according to the embodiments described herein.

The data processing system 10 shown in FIG. 1 can be used to perform the method shown in FIG. 2 in which an original compiled binary file (or a plurality of original compiled binary files) are modified by creating modifications which are then inserted into the one or more original compiled binary files to create one or more modified compiled binary files. The original compiled binary file 52 can be a compiled binary file that is compiled for a particular microprocessor architecture, and information about the particular microprocessor architecture can be included as part of the file in order to allow the appropriate modifications to be created. The modifications that are created can be designed to enhance security for the execution of the compiled binary file when it is executed. For example, the modifications 54 can add control flow integrity software that monitors the control flow of the software during execution of the modified compiled binary file 56. The modifications are created by, for example, software creation logic that is designed to add appropriate software to be inserted into the original compiled binary file in order to provide enhanced security or other behavioral changes for the software. In one embodiment, the software performs normally under most circumstances and thus legitimate software execution is not modified by the modifications created in the method shown in FIG. 2. In one embodiment, the modifications 54 are designed to be appropriate for the target architecture of the expected execution environment. Thus, the modifications 54 are tailored in one embodiment for a particular target microprocessor architecture which takes into account the size of the address space of the microprocessor architecture as well as other characteristics such as default base virtual address values, endianess (big or little endian), etc. U.S. Pat. No. 9,805,188, issued Oct. 31, 2017, describes examples of modifications to compiled executable binary files, and this patent is incorporated herein by reference.

Figure 3:
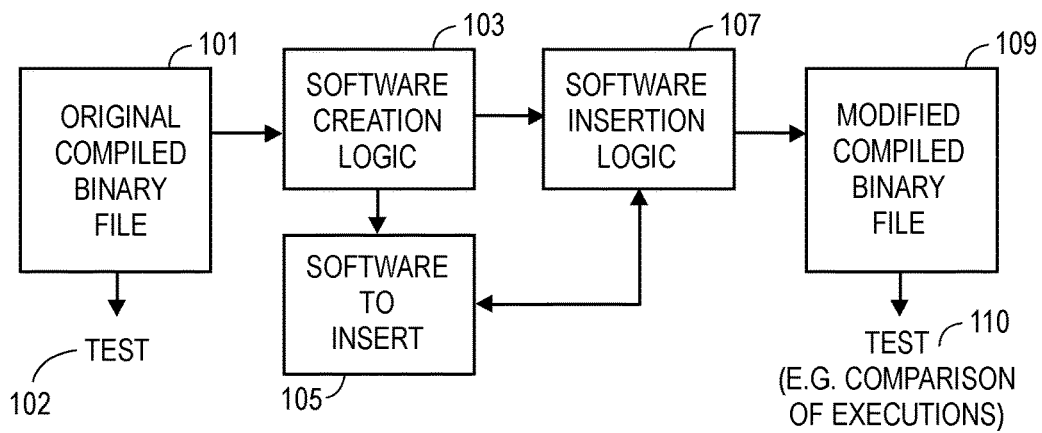
FIG. 3 is a block diagram showing software components and files used to create the modified compiled binary file according to one or more embodiments described herein.

FIG. 3 shows an example of a set of software components and logic which can be used to process an original compiled binary file to create a modified compiled binary file. In particular, software creation logic 103 and software insertion logic 107 can process the original compiled binary file 101 to create the modified compiled binary file 109 using the methods described herein. The set of software components and logic can be part of the data processing system 10 shown in FIG. 1; the software creation logic 103 and the software insertion logic 107 in one embodiment can be implemented as executable software stored in memory 12 to generate the software 105. Moreover, the system 10 can, once the software 105 is generated by the software creation logic 103, use the software insertion logic 107 to insert the software 105 into the original compiled binary file 101 to create the modified compiled binary file 109 that can be then executed on system 10 (or another data processing system). The original compiled binary file 101 can be an object code executable binary file that has been compiled for a particular target microprocessor. The software creation logic 103 can create, for the particular target microprocessor, software 105 to be inserted into the original compiled binary file 101 to create the modified compiled binary file 109. The software creation logic 103 can create modifications, such as modifications 54 and can use the methods described in U.S. Pat. No. 9,805,188 referred to above. The insertion of the software 105 can in one embodiment be performed by the software insertion logic 107 which inserts the software 105 into the original compiled binary file 101 using the method shown in FIG. 5. After the modified compiled binary file 109 is created, it can be tested by comparing the execution of the original compiled binary file 101 with the execution of the modified compile binary file 109. The test 102 can provide outputs based on known inputs and the test 110 can also provide outputs based on the same known inputs and those tests 102 and 110 can be compared to verify that the original compiled binary file 101 and the modified compiled binary file 109 operate in the same way during legitimate system behavior when neither program has been affected by malware. This testing process (by comparing the results of execution of both the original compiled binary file 101 and the modified compiled binary file 109) can verify that the addition of the software which was inserted into the original compiled binary file has not altered the desired behavior of the compiled binary file during normal legitimate system behavior when the modified compiled binary file is not affected by malware.

Figure 4:
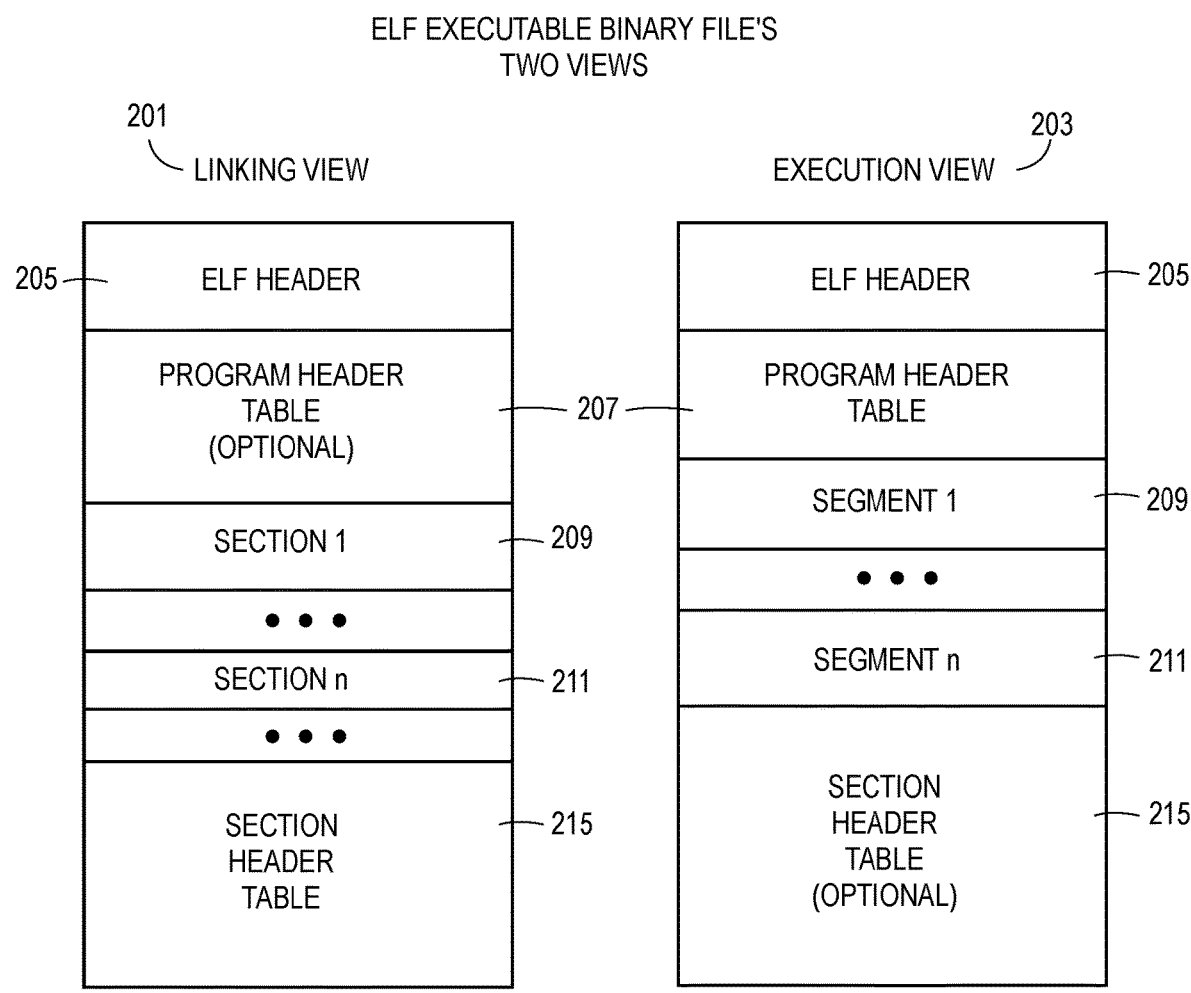
FIG. 4 shows an example of an ELF binary file and in particular shows the two views of an ELF binary file; an ELF binary file can be used in one or more embodiments described herein.

In one embodiment, the original and modified compiled binary files can use the Executable and Linkable Format (ELF) format which is shown in FIG. 4. In one embodiment, the ELF format can provide information about the target microprocessor so that the software creation logic 103 and the software insertion logic 107 can, using that information, create and insert appropriate modifications which are compatible with the target microprocessor. As is known in the art, the ELF format provides two views of a particular binary file: a linking view 201 and an execution view 203. In the linking view 201, the file includes an ELF header 205 and a program header table 207 as well as one or more sections, such as section 209 and section 211 and a section header table 215. In the execution view 203, the file includes the ELF header 205 and the program header table 207 as well as one or more segments such as segments 209 and 211 and a section header table 215. The ELF header resides in one embodiment at the beginning of the file and holds a "roadmap" describing the file's organization. Sections hold the bulk of object file information for the linking view such as instructions, data, symbol table, relocation, and so on. A program header table, tells the system how to create a process image at runtime of the program. A section header table contains information describing the file's sections. Every section has an entry in the table, and each entry gives information such as a section name, the section size, etc. Although FIG. 4 shows the program header table immediately after the ELF header, and the section header table following the sections, actual files may differ from the order shown in FIG. 4. Moreover, sections and segments have no specified order; only the ELF header in one embodiment has a fixed position in the file. In one embodiment of the method shown in FIG. 5, the ELF format is used for both the original compiled binary file and the modified compiled binary file.

Figure 5:
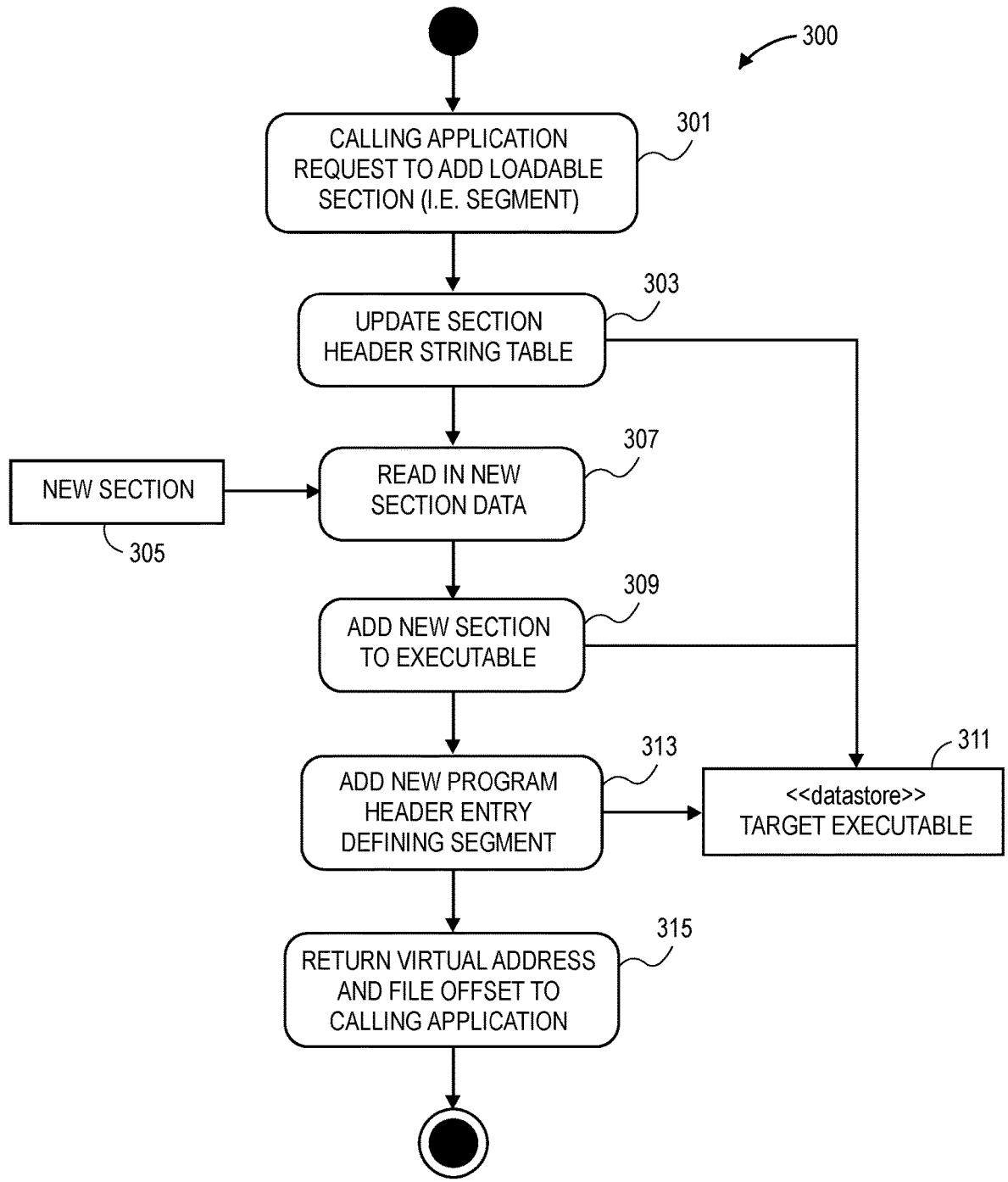
FIG. 5 is a flowchart which illustrates a particular embodiment described herein.

The method 300 shown in FIG. 5 can begin in operation 301 in which a calling application requests to add a loadable section which corresponds to a segment of the binary executable that is to be executed at runtime of the modified program. In one embodiment, the method can be performed in the order of the operations shown in FIG. 5, while in an alternative embodiment, they may be performed in a different order. In one embodiment, the calling application can be software creation logic 103 which has completed the creation of the software to be inserted which can be the new section 305 shown in FIG. 5 (which can correspond to the software 105 shown in FIG. 3). The calling application can call, for example, the software insertion logic 107 to perform the operations shown in FIG. 5 in one embodiment. The request to add the loadable section will normally include a new section name for the new loadable section which is to be added into the original compiled binary file, such as the original compiled binary file 101 shown in FIG. 3. Then in operation 303, the method can update the section header string table. In one embodiment, operation 303 can include a number of sub operations including, for example: allocating memory for a new section header string table with space for the new name; copying the contents of the existing section header string table to the new section header string table; adding the new section name to the new section header string table; appending the new section header string table to the end of the existing executable binary file; and updating the section header's entry to the section header string table pointing to the new section header string table's offset and new size. The output from operation 303 can be inserted into the target executable 311 as shown in FIG. 5; the target executable 311 corresponds to the modified compiled binary file 109 shown in FIG. 3. Operation 307 can follow operation 303. In operation 307, the new section 305 can be read into memory so that it can be inserted into the existing executable binary file, such as the original compiled binary file 101 shown in FIG. 3. The new section 305 shown in FIG. 5 can correspond to the software 105 in FIG. 3 which is to be inserted into the original compiled binary file. Operation 309 can follow operation 307; in operation 309, the new section 305 is added into the existing executable binary file such as the original compiled binary file 101 to create the target executable 311 shown in FIG. 5.

In one embodiment, operation 309 can have many sub operations. For example, operation 309 can begin by reading in the section data from the original compiled binary file and locating the end of the file (e.g., the end of the target executable file 311 as it currently exists) and page aligning the value of the address at the end of the file by rounding up the address value to the nearest page size such as 4096 bytes (in the case where a page size is 4096 bytes). The page aligned value in one embodiment will be the file offset that the new section 305 will be written to (into the target executable 311). Then, a section data structure can be populated with parameters for the new section including a virtual address, a file offset, section size and one or more flags. In one embodiment, the default base virtual address can be architecture and operating system specific. For example, on the PowerPC microprocessor architecture the default base virtual address is 0x10000000 while on an Intel microprocessor architecture it is 0x400000. In one embodiment, the new section/segment virtual address is placed below the executable's base address; in one embodiment this is necessary on platforms such as the PowerPC platform were function calls are relative and with a limited range. In one embodiment, the formula to generate the new section/segment virtual address is <base virtual address>—page_align(new section size). The new section 305 can then be written to the target executable 311 to the file offset calculated at the page aligned value described in this paragraph.

Operation 309 can also include operations to create a new section header table. In particular, operation 309 can include the following sub operations: memory is allocated for the new section header table with space for the new section header table entry; the contents of the existing section header table are copied to the new section header table; then, the new section entry data structure which was populated with parameters for the new section (including a virtual address, a file offset, a section size, and one or more flags) is added at the end of the section header table and then the new section header table is written to the end of the file which in this case is the target executable 311 shown in FIG. 5. Then the ELF header's section header table references are updated to include the file offset and the number of sections.

Operation 313 can then follow operation 309. In operation 313, a new program header entry which defines the new segment is added to create a new program header table to be inserted into the target executable 311 as shown in FIG. 5. Operation 313 can also include multiple sub operations: a segment data structure can be populated with parameters for the new segment including a virtual address, a file offset, a segment size and one or more flags that are appropriate for the new segment. Then the system can locate the end of the file and page align the address value at the end of the file by rounding up to the nearest page size such as 4096 bytes; this will be the file offset the new program header table will be written to; then the contents of the existing program header table are written to the new program header table; then, the first entry in the new program header table is updated to update the virtual address, the file offset and the size fields; then the load program header table entry is updated to include the region that the new program header table now is located at which is further away from the beginning of the file then it was before; then the new program header table is written at the location calculated based on the page aligned value calculated in the sub operation of operation 313 described above. Then, the ELF header's program header table references are updated to include the file offset and the number of program header entries. After operation 313, operation 315 can return the virtual address and file offset of the new segment to the calling operation.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for modifying an executable software file, the method comprising:
   receiving an existing executable software file;
   receiving a new loadable section for an executable segment of software to be added to the existing executable software file;
   copying content of a section header string table in the existing executable software file into a new section header string table for which memory has been allocated;
   adding a new section name for the new loadable section into the new section header string table;
   writing the new loadable section to an end of the existing executable software file;
   copying content of a section header table in the existing executable software file into a new section header table and adding a new section entry data for the new loadable section into the new section header table and writing the new section header table into the existing executable software file;
   copying content of a program header table in the existing executable software file into a new program header table and adding a new segment entry data for the executable segment into the new program header table and writing the new program header table into the existing executable software file;
   returning a virtual address and a file offset for the executable segment added to the existing executable software file to create a new executable software file.

2. The method of claim 1 wherein the executable segment is to monitor control flow integrity during execution of the new executable software file.

3. The method of claim 2 wherein execution of the new executable software file is tested by comparing execution of the new executable software file to execution of the existing executable software file as it existed before modifications by the method.

4. The method of claim 2 wherein the method is performed automatically by software insertion logic operating on a data processing system that stores the existing executable software file and creates and stores the new loadable section for the executable segment.

5. The method of claim 4 wherein the existing executable software file was compiled for execution on a predefined microprocessor architecture and the method is capable of being performed for a plurality of different microprocessor architectures.

6. The method of claim 5 wherein the virtual address for the executable segment is set to be below a base virtual address for the segments in the existing executable software file prior to modifications by the method.

7. The method of claim 5 wherein the writing of the new loadable section is at a page aligned value at an end of the existing executable software file.

8. The method of claim 5 wherein the new section header table is appended to an end of the existing executing software file.

9. The method of claim 5 wherein the existing executable software file and the new executable software file are in the Executable and Linkable Format (ELF).

10. The method of claim 1 wherein the method further comprises:
   creating the new loadable section based on specified characteristics of the existing executable software file, the specified characteristics including a target microprocessor architecture, the existing executable software file having been compiled to execute on the target microprocessor architecture; and wherein the method is performed in the sequence recited in claim 1.

11. A non-transitory machine readable medium storing executable program which when executed by a data processing system cause the data processing system to perform a method for modifying an executable software file, the method comprising:

receiving an existing executable software file;

receiving a new loadable section for an executable segment of software to be added to the existing executable software file;

copying content of a section header string table in the existing executable software file into a new section header string table for which memory has been allocated;

adding a new section name for the new loadable section into the new section header string table;

writing the new loadable section to an end of the existing executable software file;

copying content of a section header table in the existing executable software file into a new section header table and adding a new section entry data for the new loadable section into the new section header table and writing the new section header table into the existing executable software file;

copying content of a program header table in the existing executable software file into a new program header table and adding a new segment entry data for the executable segment into the new program header table and writing the new program header table into the existing executable software file;

returning a virtual address and a file offset for the executable segment added to the existing executable software file to create a new executable software file.

12. The medium of claim 11 wherein the executable segment is to monitor control flow integrity during execution of the new executable software file.

13. The medium of claim 12 wherein execution of the new executable software file is tested by comparing execution of the new executable software file to execution of the existing executable software file as it existed before modifications by the method.

14. The medium of claim 12 wherein the method is performed automatically by software insertion logic operating on a data processing system that stores the existing executable software file and creates and stores the new loadable section for the executable segment.

15. The medium of claim 14 wherein the existing executable software file was compiled for execution on a predefined microprocessor architecture and the method is capable of being performed for a plurality of different microprocessor architectures.

16. The medium of claim 15 wherein the virtual address for the executable segment is set to be below a base virtual address for the segments in the existing executable software file prior to modifications by the method.

17. The medium of claim 15 wherein the writing of the new loadable section is at a page aligned value at an end of the existing executable software file.

18. The medium of claim 15 wherein the new section header table is appended to an end of the existing executing software file.

19. The medium of claim 15 wherein the existing executable software file and the new executable software file are in the Executable and Linkable Format (ELF).

20. The medium of claim 11 wherein the method further comprises:

creating the new loadable section based on specified characteristics of the existing executable software file, the specified characteristics including a target microprocessor architecture, the existing executable software file having been compiled to execute on the target microprocessor architecture; and wherein the method is performed in the sequence recited in claim 11.

* * * * *